United States Patent [19]
MacDonald

[11] 3,763,700
[45] Oct. 9, 1973

[54] HYDRAULIC THRUST INDICATOR FOR ROTATABLE SHAFT

[75] Inventor: John MacDonald, Schenectady, N.Y.

[73] Assignee: General Electric Company, Schenectady, N.Y.

[22] Filed: Mar. 10, 1972

[21] Appl. No.: 233,600

[52] U.S. Cl. ................................................ 73/140
[51] Int. Cl. ............................................ G01l 5/12
[58] Field of Search ......................... 73/140, 141 R

[56] References Cited
UNITED STATES PATENTS
2,091,207   8/1937   Kingsbury ............................ 73/140
1,297,686   3/1919   Hashimoto ........................... 73/140

Primary Examiner—Charles A. Ruehl
Attorney—William C. Crutcher et al.

[57] ABSTRACT

A thrust indicator for a steam turbine rotor which measures the axial force of the thrust bearing housing against the outer casing while the rotor is rotating. Oppositely acting hydraulic load cells are interposed between the thrust bearing housing and the outer casing around the housing. A hydraulic pressurizing and pressure measuring system is used to determine thrust when desired. The load cells are dimensioned and constructed to carry the thrust load without pressurization when the system is inactive.

7 Claims, 6 Drawing Figures

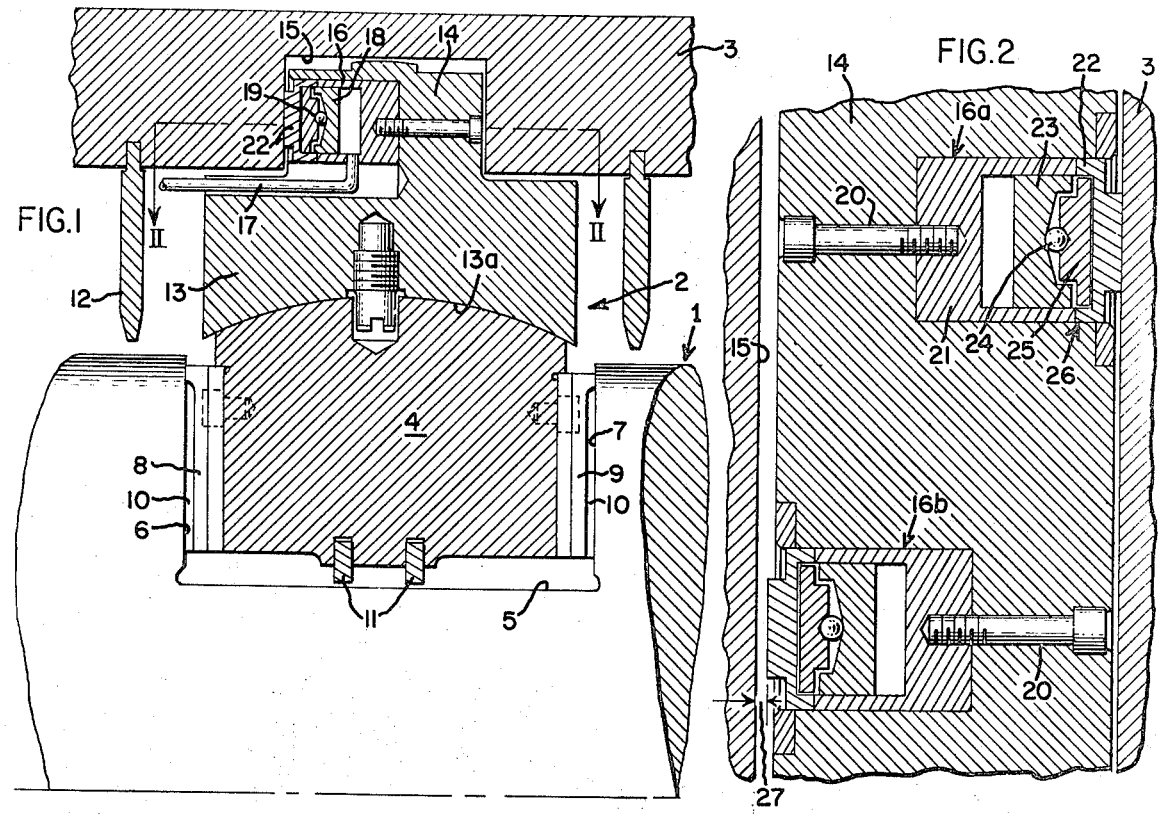
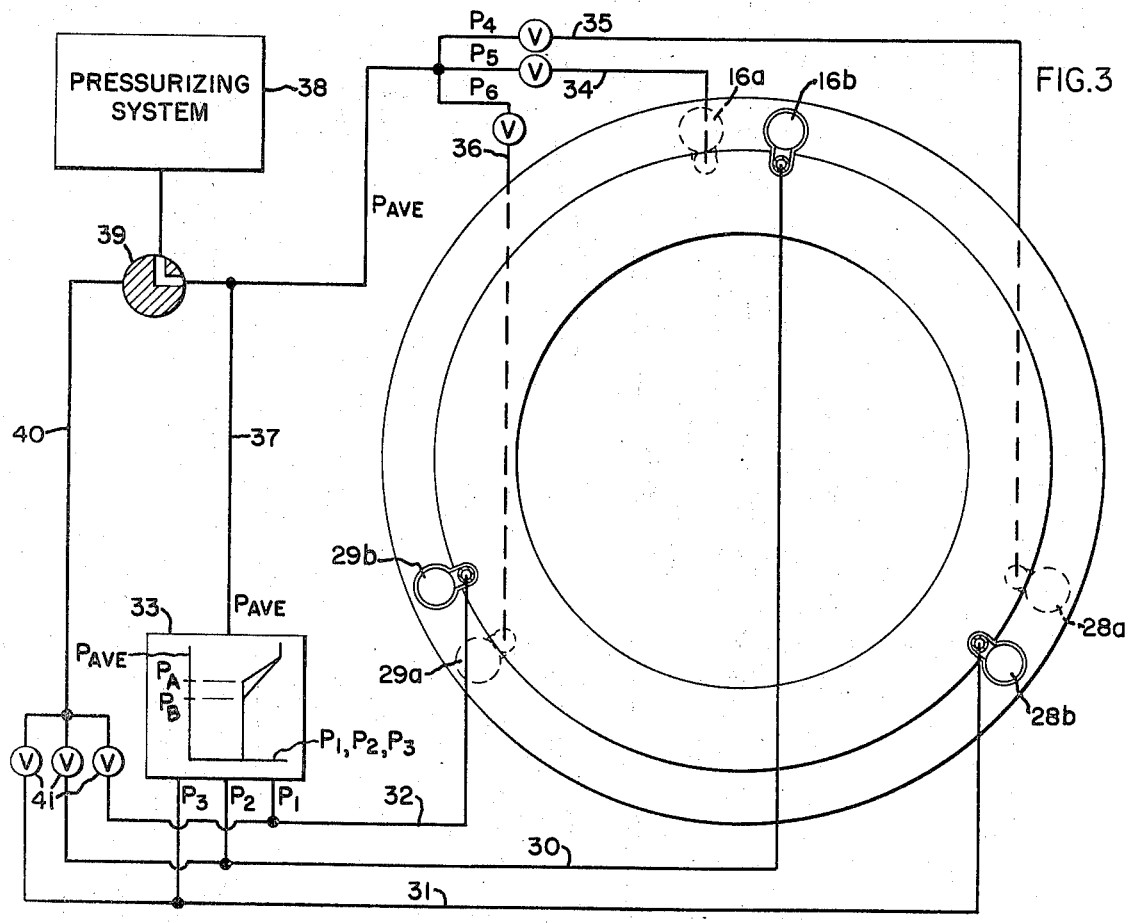

HYDRAULIC THRUST INDICATOR FOR ROTATABLE SHAFT

BACKGROUND OF THE INVENTION

This invention relates generally to a thrust bearing indicator for a rotatable shaft having a thrust bearing, and more particularly to a hydraulic thrust indicating system for such a thrust bearing.

Determination of the thrust upon a rotating shaft has been carried out by various special contrivances for experimental reasons. Extensive instrumentation using strain gauges, hydraulic devices and the like have been used to determine shaft thrust. There has been a need for a thrust indicator of rugged construction and simple operation which is sufficiently reliable to use in large turbines as a commercial accessory instrument as well as an experimental unit. The present invention relates to the latter type of thrust indicator.

Strain gauges have been used in the past to measure thrust in commercial machines because of the necessity for always keeping axial movements of the rotor and thrust bearing housing small and under positive constraint. Strain gauges have been somewhat unreliable and costly. Various types of hydraulic systems have also been suggested for measuring thrust, but these generally require substantial movements of the rotor or thrust housing and such movements are either unpermissible or prevent suitable safeguards in the event of hydraulic failure.

Accordingly, one object of the present invention is to provide an improved hydraulic thrust indicator for a thrust bearing which is simple and which contains safeguards making it suitable for a commercial accessory instrument.

Another object of the invention is to provide an improved hydraulic system for measuring thrust on a rotating shaft without the necessity for significant axial movement of the rotor during measurement.

Still another object of the invention is to provide an improved thrust indicator which permits detection and diagnosis of uneven thrust loads on the thrust bearing.

SUMMARY OF THE INVENTION

Briefly stated, the invention comprises placement of uniformly spaced and oppositely disposed hydraulic load cells around the interface between an outer casing and the thrust bearing housing. Means are provided for pressurizing a group of inactive load cells on the inactive thrust side and then pressurizing a group of active or thrust-carrying load cells on the active thrust side while monitoring changes in load cell pressures on the inactive side. The thrust-carrying load cells are also adapted to carry the thrust when the hydraulic system is not pressurized.

DRAWING

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

FIG. 1 is a horizontal elevation, partly in section, of a fragment of a turbine rotor thrust bearing and support structure, FIG. 2 is a view taken in a radial direction along lines II—II of FIG. 1 showing a pair of oppositely disposed load cells, FIG. 3 is an end view of the thrust bearing housing ring, incorporating a schematic representation of the hydraulic pressurizing and measuring system, and FIG. 4–6 are simplified views of modified forms of the invention illustration variations in load cell placement.

DESCRIPTION OF THE PREFERRED EMBODIMENT

Figure 4:
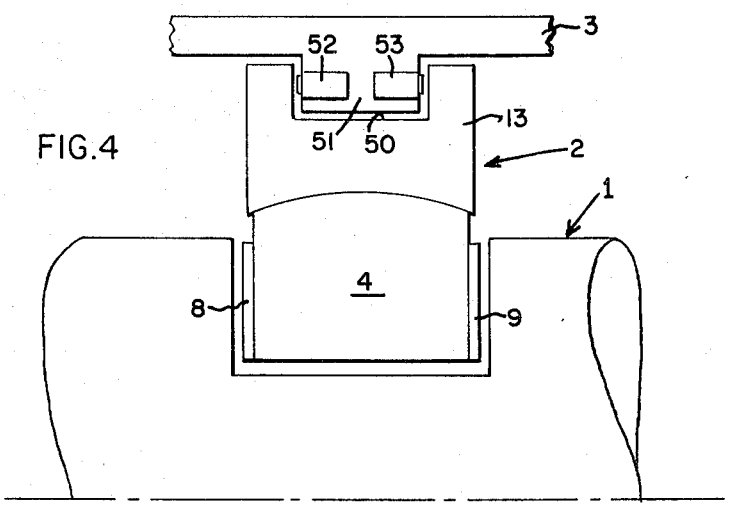

Referring now to FIG. 1 of the drawing, the upper half of a turbine rotor 1 is rotatably mounted in bearings (not shown) and subject to an axial thrust which is normally in one direction but which may be reversed on some occasions. Axial thrust is resisted by means of a thrust bearing shown generally at 2 and the thrust load is transmitted to an outer casing 3.

The details of thrust bearing 2 are not material to the present invention, but for purposes of illustration, there is shown a tilted shoe thrust bearing having a split bearing ring 4 inserted in a circumferential groove 5 in rotor 1 between radial thrust-carrying surfaces 6, 7. Bearing ring 4 has attached thereto segmental thrust plates 8, 9. Suitables passages (not shown) through bearing ring 4 are provided to carry lubricating oil to the groove 5 from whence it is fed to radial passages 10 in thrust plates 8, 9. Interior sealing rings 11, and exterior deflector rings 12 guide the flow of lubricating oil and keep it within the thrust bearing.

Thrust bearing ring 4 is held in a thrust bearing housing 13 on a spherical bearing surface 13a to allow for slight misalignment. Housing 13, in turn, has a circumferential flange portion 14 which is held within a circumferential groove 15 in outer casing 3. The axial clearance between groove 15 and the flange 14 is typically very small.

In accordance with the present invention, a number of hydraulic load cells such as the one indicated at 16 are distributed around flange portion 14 in a manner to be described. The load cells are connected to hydraulic supply lines 17 running through passages in the housing 13 for use in pressurizing and then measuring pressures in the load cells.

Various types of commercially available load cells, an example being Model No. LH–250, manufactured by Enerpac Co., may be used, provided that they are suitably modified to carry thrust when not pressurized, in accordance with one aspect of the invention to be explained. Such cells typically have a small inner piston 18 and a universal load bearing support such as the ball support 19 to automatically adjust for misalignment.

Referring now to FIG. 2 of the drawing, a view looking inward from a radial direction shows the flange portion 14 of the thrust bearing housing disposed in circumferential groove 15 of the outer casing 3. A pair of oppositely disposed load cells 16a, 16b are shown held in place by bolts 20. Cell 16a faces the side from which thrust is coming, or the active side, while cell 16b faces the inactive side leaving a clearance.

Each load cell is identical and includes a body 21 with a thrust bearing cap 22 forming a hollow enclosure. A thrust piston 23 is arranged to exert a force upon a ball member 24 when hydraulic fluid is supplied to the load cell chamber. The ball 24 transmits force to a load equalizing pad 25 which, in turn, exerts force on the cap 22.

It is important to note that the walls of the body 21 and the cap 22 meet at a circumferential load bearing surface 26. Thus the load cell 16a will carry full thrust between outer casing 3 and flange 14 when no hydraulic fluid is supplied to the load cell. Load cell 16b is similarly constructed.

The dimensions of the load cells 16a, 16b are such that when the caps 22 are seated against bodies 21 the ends of the caps project about 0.015 inch beyond the face of flange 14, leaving a very small axial clearance, on the order of 0.005 inch, available for movement of the flange portion 14 in groove 15. This axial clearance shown at 27 is exaggerated for clarity.

Reference to FIG. 3 of the drawing indicates placement of the load cell pairs such as 16a, 16b around the periphery of the casing ring 13. Cells are uniformly spaced on either side, a suitable arrangement being three such pairs of opposed load cells 120° apart. The additional pairs being indicated as 28a, 28b, 29a and 29b, the suffix "a" indicating the active side.

The hydraulic system is schematically indicated with single lines representing hydraulic piping. Inactive cells 16b, 28b and 29b are connected via lines 30, 31, 32, respectively, to a conventional x-y recorder 33. Similarly, oppositely disposed active cells 16a, 28a, 29a are connected via lines 34, 35, 36, respectively, to a common supply line 37 which is also connected to the recorder 33.

A pressurizing system 38 is connected via a three-way valve 39 to the common supply line 37 and to another supply line 40. When three-way valve 39 is in the opposite position than that shown, therefore, it connects the pressurizing system 38 to line 40 which, via valves 41, serves to pressurize the lines 30, 31, 32. The pressurizing system 38 may comprise a conventional hydraulic pump and hydraulic supply system with suitable controls for supplying a selected pressure in the range of 0 to 15,000 psig.

OPERATION OF THE INVENTION

When thrust is not being measured, the hydraulic system is depressurized and the hydraulic load cells on the "active" side serve to transmit thrust load through the rigid junction 26 between body 21 and cap 22 (see FIG. 2). Under some conditions of operation, should the thrust load be reversed, the depressurized load cells on the opposite or "inactive" side, such as cell 16b in FIG. 2, carry thrust load through this rigid connection in a similar manner.

Measurement of thrust takes place in the following way. Recorder 33 and pressurizing system 38 are activated and line 40 is pressurized with valves 41 open so as to actuate load cells 16b, 28b, and 29b on the inactive side to close up the clearances 27 (FIG. 2). The inactive cell pressures appear on the x axis of the x-y recorder as the distance to the first vertical line. Then valves 41 are closed to hold pressure, the actual pressure selected not being critical. Three-way valve 39 is next positioned as shown in the drawing and pressure increased gradually in line 37, while the average pressure PAVE increases as shown by a vertical line on the x-y recorder. Hydraulic fluid is supplied to the active side of the thrust bearing housing through active load cells 16a, 28a, 29a. These load cells on the active side are pressurized until the thrust bearing casing just commences to move, at which time, the load cells on the inactive side will be compressed, thereby causing an abrupt increase in inactive cell pressures $P_1$, $P_2$ and $P_3$. This is indicated by the sloping line on the x-y recorder commencing at the point $P_A$.

The system is then depressurized and as the thrust load is transferred back to the rigid cell body, there will be an abrupt drop in pressures $P_1$, $P_2$, $P_3$. This is indicated by the lower sloping line terminating at $P_B$. The average pressure at $P_A$ does not correspond to that at $P_B$ because of hysteresis, and the values must be averaged. Thrust may be calculated through the relation:

Thrust = $(P_A + P_B)/(2) \times A_a - (P_1 + P_2 + P_3) \times A_b$ where $A_a$ is the total area of the active load cells, $A_b$ is the total area of the inactive load cells, and $P_1$, $P_2$ and $P_3$ are the initial pressure values.

The inactive side load cells are shown separately connected to the recorder 33 in order to give an indication of uneven thrust load by noting any differences between individual pressures $P_1$, $P_2$ and $P_3$. They may alternatively be connected via a common line to the recorder.

MODIFIED FORMS OF THE INVENTION

While the load cell pairs are shown slightly angularly offset from one another in FIGS. 1–3, this is done for convenience because of the length of the load cells commercially available and gives satisfactory performance without having to lengthen the thrust housing flange 14. The opposed load cells may be directly in line with one another if they are not too long, or alternatively, the load cells on the active side may be spaced so as to divide the angular arc between the load cells on the inactive side.

It should also be apparent that, alternatively, the load cells may be disposed in the outer casing walls rather than in the thrust housing flange. Also, other arrangements of holding the thrust housing in the outer casing would obviously include a reversal of the configuration of flange 14 and the groove 15. Such alternative arrangements are shown in the simplified views of FIGS. 4–6.

In FIG. 4, thrust housing 13 has a groove 50, rather than a flange, while outer casing 3 has a mating annular flange 51. The oppositely disposed pair of load cells 52, 53 are embedded in the walls of the flange 51.

Figure 5:
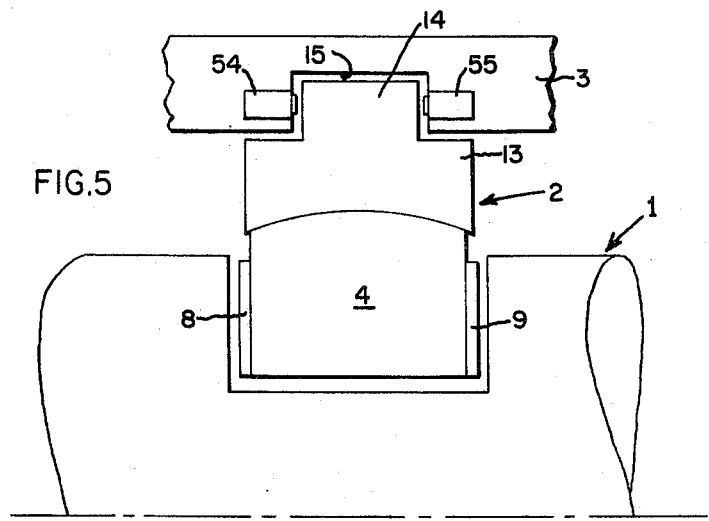

In FIG. 5, thrust housing 13 has an annular flange 14 similar to FIG. 1 disposed in a mating groove 15. However, the load cells 54, 55 are embedded in the walls of the groove rather than in the flange 14.

Figure 6:
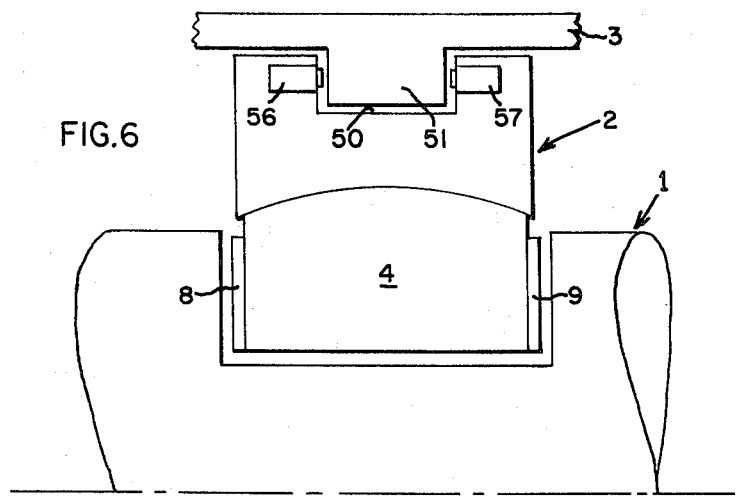

FIG. 6 is similar in construction to FIG. 4 insofar as the arrangement of flange 51 and groove 50 are concerned. However, the load cells 56, 57 are spaced around and embedded within the walls of groove 50.

All of the foregoing arrangements perform in the same manner as described in connection with FIG. 3. However, one arrangement or the other may be preferable depending on the design.

One advantage of the foregoing described system is that only an infinitesimal movement of the thrust housing is necessary in order to cause a change in pressure in the load cells on the inactive side. Thus, axial clearances in other parts of the turbine are unnecessary. Another advantage is the safeguard provided by the positive meeting surfaces of the load cell cap and body which are designed to carry the full load on the thrust bearing housing at all times when the hydraulic system is depressurized.

While there is disclosed herein what is considered to be the preferred embodiment of the invention, other modifications will be apparent to those skilled in the art and it is desired to cover in the appended claims all such modifications as fall within the true spirit and scope of the invention.

What is claimed is:

1. A thrust indicator for a rotatable shaft comprising:
   a thrust bearing having opposed thrust surfaces disposed in rubbing relation to a rotatable shaft subject to axial thrust and having a thrust housing portion defining opposed thrust-transmitting walls,
   an outer casing having a portion adapted to hold said thrust housing portion within small axial clearances and defining opposed thrust-receiving walls,
   a plurality of hydraulic load cells having hydraulically actuatable rigidly seated cap members, said cells being divided into active and inactive groups with said cap members directed in opposite directions and arranged when seated to transmit thrust between the thrust housing and the outer casing on an active side by the active group against a normal thrust load and on an inactive side by the inactive group against a reversing thrust load,
   means for pressurizing selected load cells on said inactive side, and
   means for indicating change in pressures in the cells on the inactive side while applying a known hydraulic pressure to selected load cells on the active side.

2. The combination according to claim 1, wherein said thrust housing portion is an annular flange, said outer casing portion defines a mating annular groove, and wherein said load cells in said groups are uniformly spaced around said flange and imbedded therein with opposed cap members forming close clearances with said thrust-receiving walls of the outer casing portion.

3. The combination according to claim 1, wherein said thrust housing portion defines an annular groove, said outer casing portion is a mating annular flange, and wherein said load cells in said groups are uniformly spaced around said flange and imbedded therein with opposed cap members forming close clearances with said thrust-transmitting walls of the thrust housing portion.

4. The combination according to claim 1, wherein said thrust housing portion is an annular flange, said outer casing portion defines a mating annular groove, and wherein said load cells in said groups are uniformly spaced around opposite walls of the groove and imbedded therein with opposed cap members forming close clearances with said thrust-transmitting walls of the thrust housing portion.

5. The combination according to claim 1, wherein said thrust housing portion defines an annular groove, said outer casing portion is a mating annular flange, and wherein said load cells in said groups are uniformly spaced around the walls of the groove and imbedded therein with opposed cap members forming close clearances with said thrust-receiving walls of the outer casing portion.

6. The combination according to claim 1, wherein said load cells each have a body with a wall defining a cylinder, a cap member with a force transmitting wall seated on said body wall, a hydraulic piston disposed in said cylinder, and a universally supported pad disposed to move said cap member when the piston is actuated by hydraulic fluid.

7. The combination according to claim 1, wherein said indicating means comprises an $x$–$y$ recorder connected to indicate inactive cell pressures on one axis and active cell pressures on the other axis.

* * * * *